US006941570B2

United States Patent
Kim

(10) Patent No.: US 6,941,570 B2
(45) Date of Patent: Sep. 6, 2005

(54) CLAMP DEVICE FOR OPTICAL DISC

(75) Inventor: Young-Taek Kim, Yongin-si (KR)

(73) Assignee: Samsung Electro-Mechanics Co., Ltd., Kyunggi-Do (KR)

( * ) Notice: Subject to any disclaimer, the term of this patent is extended or adjusted under 35 U.S.C. 154(b) by 357 days.

(21) Appl. No.: 10/226,107

(22) Filed: Aug. 23, 2002

(65) Prior Publication Data

US 2003/0147337 A1 Aug. 7, 2003

(30) Foreign Application Priority Data

Feb. 7, 2002 (KR) .......................................... 2002-7043

(51) Int. Cl.[7] ............................................ G11B 17/03
(52) U.S. Cl. ..................................................... 720/709
(58) Field of Search ...................... 720/709; 369/270.1, 369/271.1, 75.11, 75.21, 270, 271, 75.1, 75.2; 360/99.12

(56) References Cited

U.S. PATENT DOCUMENTS

| 4,358,803 | A | * | 11/1982 | Van Der Giessen | ..... 360/99.12 |
| 4,458,278 | A | * | 7/1984 | Maclay et al. | ........... 360/99.05 |
| 4,747,002 | A | * | 5/1988 | Takikawa et al. | ........ 360/99.05 |
| 5,034,933 | A | * | 7/1991 | Fujisawa et al. | ......... 369/13.35 |
| 6,438,087 | B2 | * | 8/2002 | Omori | ........................ 369/75.2 |

FOREIGN PATENT DOCUMENTS

JP 10003718 * 1/1998

* cited by examiner

Primary Examiner—Angel Castro
(74) Attorney, Agent, or Firm—Morgan, Lewis & Bockius LLP

(57) ABSTRACT

A clamp device for an optical disc is disclosed. The clamp device includes a cover frame having a receiving space and an opening at its bottom surface; a holder chuck which is received at its upper part in the receiving space of the cover frame and rotatably and movably supported thereby, the holder chuck being provided at its lower surface a downward projection and provided at its lower surface with a center ring seating recess tapered upward, the center ring seating recess being centrally provided with a center post; a spring disposed between the cover frame and the holder chuck to bias the holder chuck downward; and a plate chuck coupled to a lower surface of the holder chuck, which is centrally formed with a through hole, through which the projection of the holder chuck passes. Upon being subjected to external shocks, the center of the holder chuck is separated from a center recess and then restored to an initial normal position, so that transmission of external shocks to the turntable and a driving motor is interrupted, thereby improving reliability in writing and/or reading data.

8 Claims, 4 Drawing Sheets

CLAMP DEVICE FOR OPTICAL DISC

BACKGROUND OF THE INVENTION

1. Field of the Invention

The present invention relates to a clamp device for an optical disc, and more particularly to a clamp device for an optical disc which enables a holder chuck and a plate chuck to be moved up and down to interrupt transmission of external shocks.

2. Description of the Prior Art

In general, an optical writing and reading apparatus comprises a turntable on which an optical disc is seated, means for driving the turntable, a clamp device for preventing an optical disc from being deviated from the turntable during rotation of the turntable, an optical pickup device for writing and/or reading information to and/or from an optical disc while radially moving on the optical disc, and means for driving the optical pickup device to move radially.

FIG. 1 shows an optical disc seated on a turntable, in which the optical disc is clamped by an internal clamp device.

As shown in the drawing, a driving motor 3 is fixedly attached to a deck 1, and a turntable 5 is rotatably joined to a shaft 3a of the driving motor 3.

The turntable 5 is provided at its upper surface with a center ring 7, which enables an optical disc "D" to be positioned at the center of the turntable 5. The center ring 7 is centrally formed at its upper surface with a center hole 7a of a certain depth.

When an optical disc "D" is fitted on the center ring 7 and is seated on the turntable 5, the optical disc "D" is clamped by the internal clamp device 10 to prevent the optical disc "D" from being separated form the turntable 5 during rotation of the turntable.

The internal clamp device 10 is configured such that a cover frame 12 is provided at its bottom surface with a holder chuck 14, and the holder chuck 14 is centrally formed at its lower surface with a center protrusion 14a, which is projected downward and is fitted into the center hole 7a of the center ring 7.

In addition, the holder chuck 14 is provided at its lower surface with a plate chuck 16, which is seated on an optical disc "D".

In an operation of the internal clamp device 10, the center protrusion 14a of the holder chuck 14 is inserted into the center hole 7a to center an optical disc "D" on the turntable, and the plate chuck 16 is seated on an upper surface to prevent deviation of an optical disc "D" during rotation of the turntable 5 and to prevent a fluctuation of an optical disc "D".

However, such a conventional internal clamp device 10 has disadvantages in that since the holder chuck 14 and the plate chuck 16 are fixedly coupled to the cover frame 12, when the internal clamp device is subjected to external shocks by a user's fault in the course of transportation or dropping of the device, the shocks are directly transmitted to the turntable 5 and the driving motor 3, thereby affecting a skew of the driving motor 3, resulting in reduction of a performance in reading data from an optical disc.

Referring to FIG. 2, there is shown an external clamp device by which an optical disc is clamped.

As shown in the drawing, the external clamp device 20 is different from the above-described internal clamp device in that a plate chuck 26 which is fixedly coupled to a lower surface of the cover frame 22 by a holder chuck 24 is externally fitted to an outer surface of a center ring 9 of a turntable 5 to position an optical disc "D" at the center of the turntable 5.

In other words, the center ring 9 is provided with a tapered outer surface, and the plate chuck 26 is centrally provided with a center-positioning concave recess 26a having a tapered inner surface corresponding to the tapered outer surface of the center ring 9.

However, such a conventional external clamp device 20 also has a disadvantage like the above internal clamp device in that the device is decreased in a performance in reading data from an optical disc owing to external shocks.

SUMMARY OF THE INVENTION

Accordingly, the present invention has been made keeping in mind the above problems occurring in the prior art, and an object of the present invention is to provide a clamp device for an optical disc which is adapted to absorb external socks to prevent the shocks from being transmitted to a turntable and a driving motor.

In order to accomplish the above object, the present invention provides a clamp device for an optical disc comprising a cover frame having a receiving space and an opening at its bottom surface; a holder chuck which is received at its upper part in the receiving space of the cover frame and rotatably and movably supported thereby, the holder chuck being provided at its lower surface with a downward projection and further provided at its lower surface with a center ring seating recess tapered upward, the center ring seating recess being centrally provided with a center post; a spring disposed between the cover frame and the holder chuck to bias the holder chuck downward; and a plate chuck coupled to a lower surface of the holder chuck, which is centrally formed with a through hole, through which the projection of the holder chuck passes.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
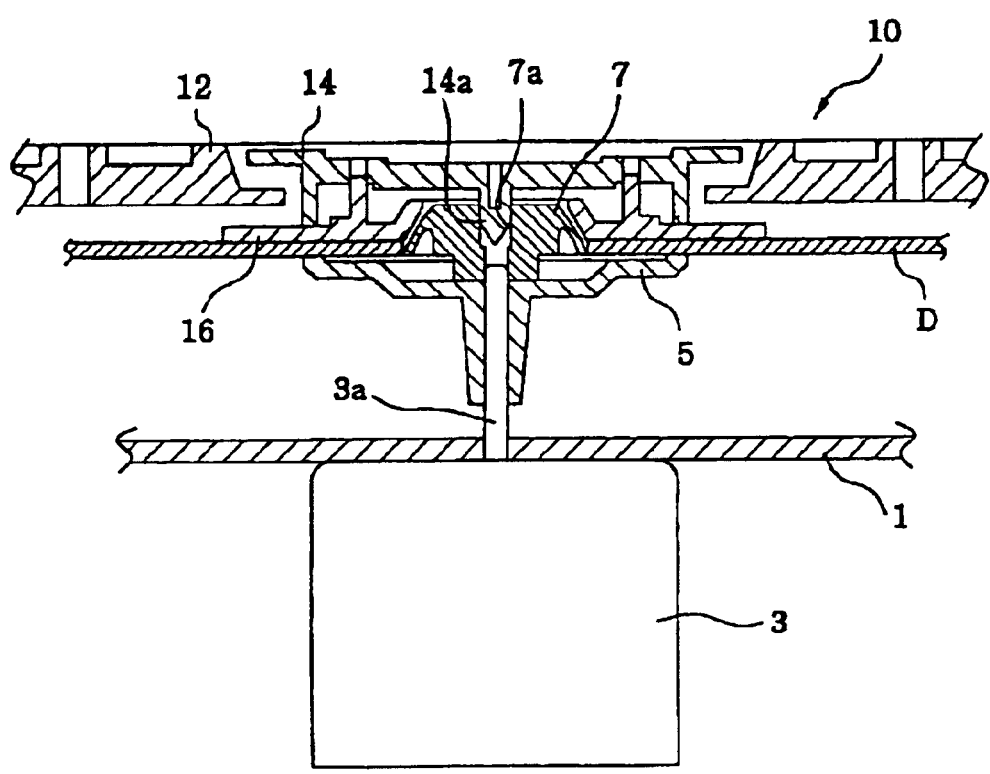
FIG. 1 is a cross-sectional view showing a conventional internal clamp device in which an optical disc is seated on a turntable and clamped by the device.
Figure 2:
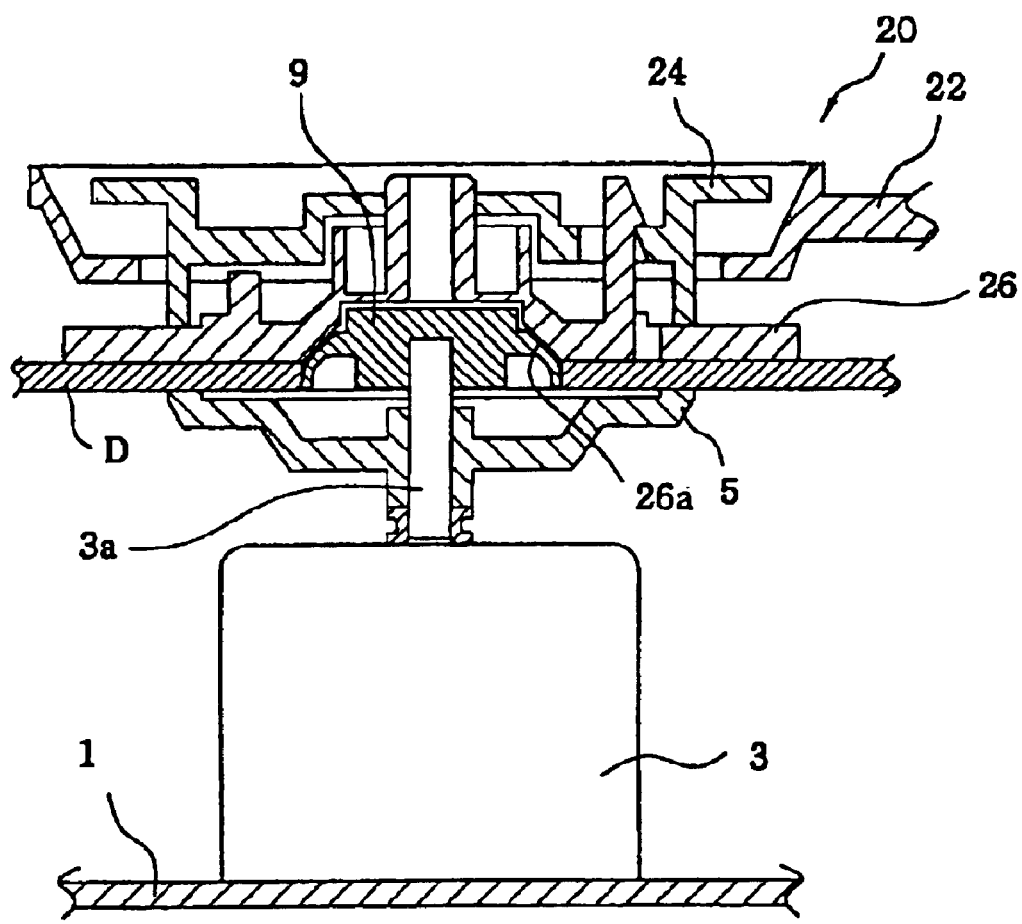
FIG. 2 is a cross-sectional view showing a conventional external clamp device in which an optical disc is seated on a turntable and clamped by the device.

Reference now should be made to the drawings, in which the same reference numerals are used throughout the different drawings to designate the same or similar components.

Figure 3:
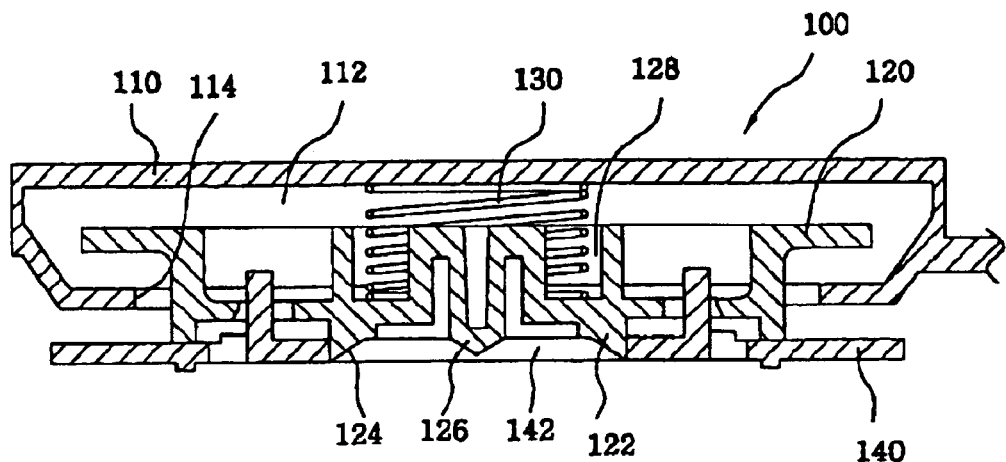
FIG. 3 is a cross-sectional view of a clamp device for an optical device according to the present invention.
Figure 4:
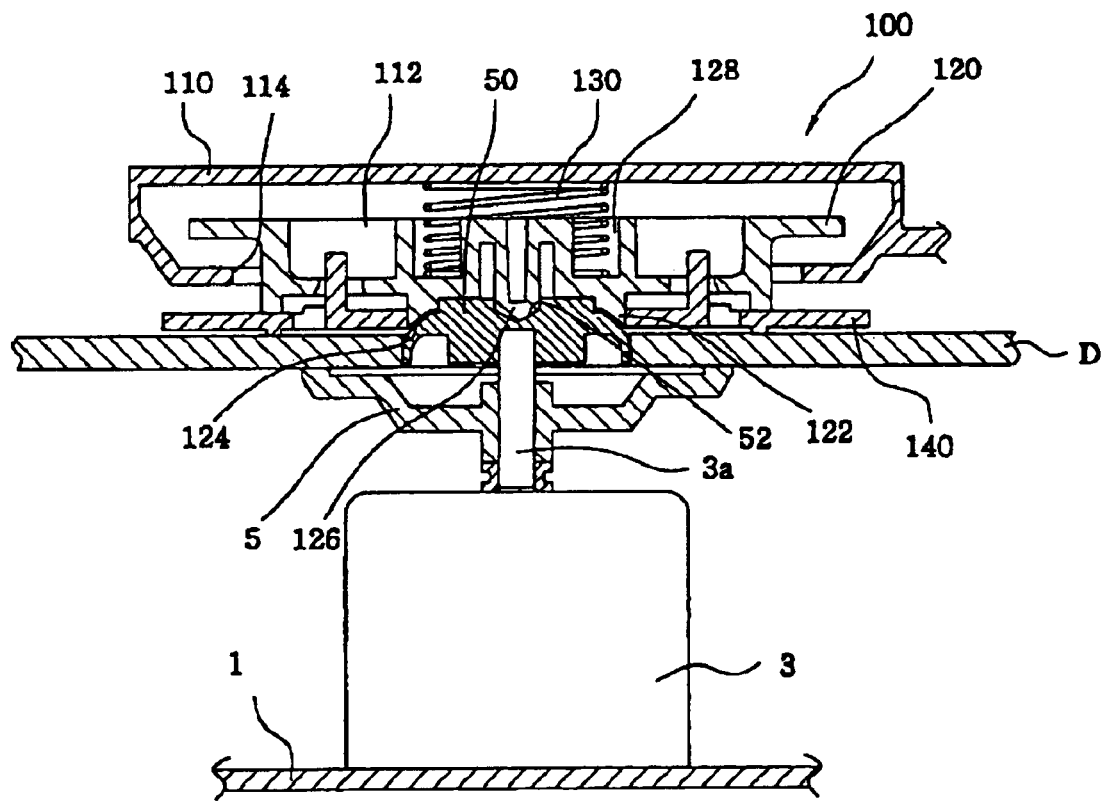
FIG. 4 is a cross-sectional view showing the clamp device according to the present invention in which an optical disc is seated on a turntable and clamped by the device.
Figure 5:
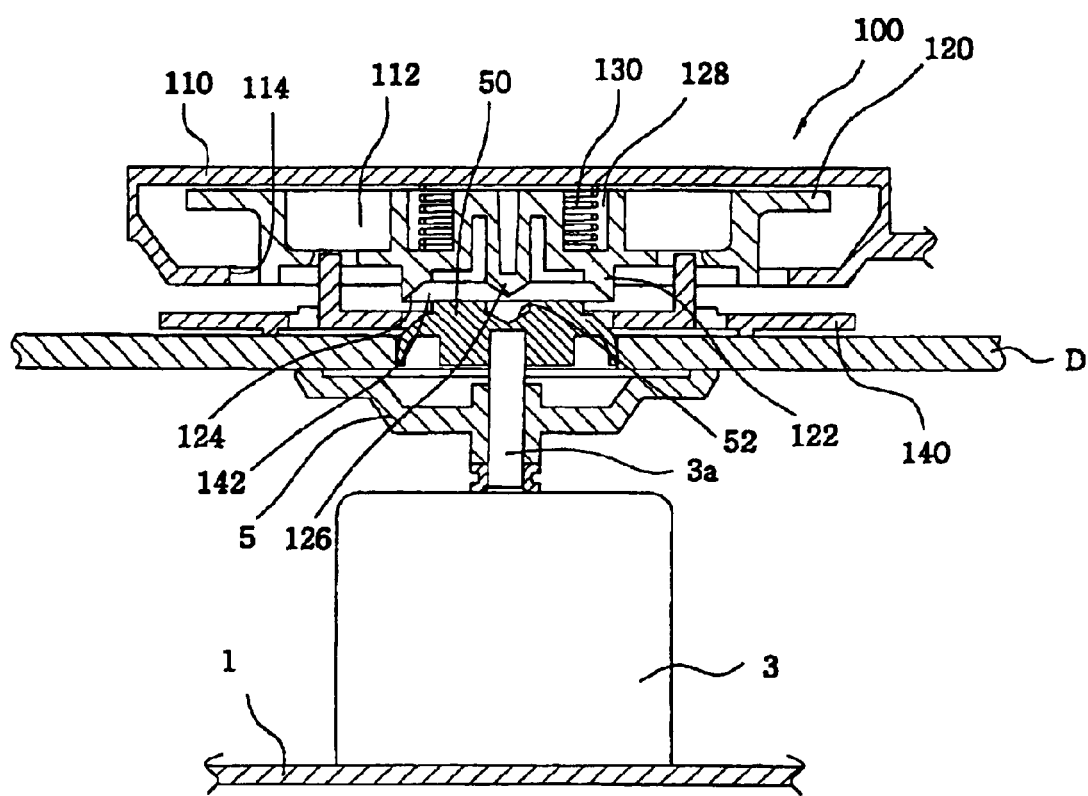
FIG. 5 is a cross-sectional view showing the clamp device according to the present invention, which is separated from a turntable upon being subjected to external shock.

FIG. 3 is a cross-sectional view of a clamp device for an optical disc according to the present invention, FIG. 4 is a cross-sectional view showing an optical disc seated on a turntable of an optical writing and reading apparatus in which the optical disc is clamped by the clamp device according to the present invention, and FIG. 5 is a cross-sectional view of the clamp device according to the present invention which is operated by external shocks.

As shown in FIGS. 3 and 4, a driving motor 3 is mounted on a deck 1, and a turntable 5 is rotatably coupled to a rotating shaft 3a of the driving motor 3.

The turntable 5 is centrally provided at its upper surface with a center ring 50 on which an optical disc "D" is fitted to be positioned at the center of the turntable, and the center ring 50 is centrally formed at its upper surface with a center recess 52. The center ring 50 is provided with an outer surface tapered upward.

Once the optical disc "D" is fitted on the center ring 50 and seated on the turntable 5, a plate chuck 140 of the clamp device 100 is lowered to press the optical disc so as to prevent deviation of the optical disc "D" during rotation of the turntable 5.

The clamp device 100 according to the present invention includes a cover frame 110, which is disposed above the turntable 5 to be moved up and down.

The cover frame 110 includes a receiving space 112 therein. The cover frame 110 also has an opening 114 formed at its bottom surface, by which a displacing limit of a holder chuck 120 is determined. The holder chuck 120 is rotatably disposed on a bottom surface of the cover frame 110.

The holder chuck 120 is received at its upper end in the receiving space 112 of the cover frame 110, and is centrally provided at a lower surface with a center projection 122 extended downward.

The center projection 122 is formed at a lower surface with a center ring seating recess 124. The center ring seating recess 124 has an inner tapered surface tapered upward so that the seating recess 124 is closely fitted to the outer tapered surface. The center ring seating recess 124 is centrally provided with a center post 126, which is disposed in the center recess 52 of the center ring 50.

The holder chuck 120 is provided at its upper center portion with a receiving groove 128 of a certain depth, in which a spring 130 is inserted to bias the holder chuck downward between the cover frame 110 and the holder chuck 120.

The plate chuck 140 is disposed under the holder chuck 120 such that the plate chuck 140 is in close contact with a lower surface of the holder chuck 120. The plate chuck 140 is fixedly coupled to the holder chuck 120 and is operated therewith. The plate chuck 140 is centrally formed with a trough hole 142, through which the center projection 122 of the holder chuck 120 is passed.

An operation of the clamp device according to the present invention will now be described.

The clamp device 100 according to the present invention is intended to center an optical disc "D" on the turntable by being seated on the optical disc "D", and to prevent deviation of the optical disc "D" during rotation of the optical disc "D". The clamp device 100 is also designed to allow the holder chuck 120 to be separated from the center ring 50 of the turntable 5 upon being subjected to external shocks.

More specifically, as shown in FIG. 5, upon being subjected to external shocks, the holder chuck 120 is separated from the center ring 50 of the turntable 5 and is raised by the elasticity of the spring 130.

Once the holder chuck 120 is separated from the center ring 50 of the turntable 5 and raised, transmission of external shocks to the turntable 5 is interrupted. Therefore, it is possible to prevent deformation and warp of the turntable 5 and the rotating shaft 3a of the driving motor 3, which may be generated in a conventional clamp device.

Accordingly, even though external shocks are transmitted to a product including the clamp device according to the present invention, performance in writing and reading data is not decreased, thereby improving stability and reliability of a product.

As again shown in FIG. 5, although the holder chuck 120 is separated from the center ring 50 by external shocks, the holder chuck 120 can be restored to the initial normal position by elasticity of the spring 130.

Furthermore, since the center projection 122 of the holder chuck 120 is provided with the center ring seating recess 124 to be in close contact with the center ring 50 and the center post 126 to be positioned in the center recess 52, the clamp device according to the present invention can be applied to optical pickups adopting an internal clamp device as well as an external clamp device.

As described above, according to a clamp device for an optical disc according to the present invention, since a center post of a holder chuck is separated from a center recess of a center ring and then restored to the center recess, transmission of external shocks to a driving motor is interrupted. Accordingly, performance in writing and reading data is hardly decreased, thereby improving reliability of products.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A clamp device for an optical disc comprising:
   a cover frame having a receiving space and an opening at its bottom surface;
   a holder chuck which is received at its upper part in the receiving space of the cover frame and rotatably and movably supported thereby, the holder chuck being provided at its lower surface with a downward projection and further provided at its lower surface with a center ring seating recess tapered upward, the center ring seating recess being centrally provided with a center post;
   a spring disposed between the cover frame and the holder chuck to bias the holder chuck downward; and
   a plate chuck coupled to a lower surface of the holder chuck, which is centrally formed with a through hole, through which the projection of the holder chuck passes.

2. The clamp device as set forth in claim 1, in which the holder chuck is centrally provided at its upper surface with a receiving groove of a certain depth, in which the spring is inserted.

3. The clamp device as set forth in claim 1, in which the center ring seating recess is applied to an external clamp device.

4. The clamp device as set forth in claim 1, in which the center post is applied to an internal clamp device.

5. A clamp device for an optical disc comprising:
   a holder chuck coupled to a center ring of a turntable and disposed under a cover frame that is disposed movably up and down above the turntable; and
   a plate chuck placed on an optical disc, whereby the holder chuck and the plate chuck are elastically positioned to be moved up and down by a spring disposed between the holder chuck and the cover frame, so that the holder chuck is automatically separated from the turntable to prevent transmission of external shocks to the turntable upon being subjected to the external shocks, and the holder chuck is centrally provided at its lower surface with a downward central projection, the downward central projection being provided at its lower surface with a center ring seating recess having a tapered surface to be in close contact with an outer surface of a center ring of the turntable, the center ring seating recess being centrally provided with a center post.

6. The clamp device as set forth in claim 5, in which the center ring seating recess is applied to an external clamp device.

7. The clamp device as set forth in claim 5, in which the center post is applied to an internal clamp device.

8. A clamp device for an optical disc comprising:

a cover frame disposed above a turntable to be moved up and down;

a holder chuck coupled to a lower surface of the cover frame to be rotated and moved up and down, the holder chuck being provided at its lower surface with a downward projection and further provided at its lower surface with a center ring seating recess tapered upward, the center ring seating recess being centrally provided with a center post;

a spring disposed between the cover frame and the holder chuck to bias the holder chuck downward; and a plate chuck operated together with the holder chuck to selectively press an optical disc.

* * * * *